(12) United States Patent
Bonaparte et al.

(10) Patent No.: US 9,215,471 B2
(45) Date of Patent: Dec. 15, 2015

(54) BITSTREAM MANIPULATION AND VERIFICATION OF ENCODED DIGITAL MEDIA DATA

(75) Inventors: Jarred Bonaparte, Seattle, WA (US); Firoz Dalal, Sammamish, WA (US); Yongjun Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 955 days.

(21) Appl. No.: 12/945,728

(22) Filed: Nov. 12, 2010

(65) Prior Publication Data

US 2012/0121025 A1  May 17, 2012

(51) Int. Cl.
*H04N 19/40* (2014.01)
*H04N 19/89* (2014.01)
*H04N 7/52* (2011.01)

(52) U.S. Cl.
CPC .............. *H04N 19/40* (2014.11); *H04N 19/89* (2014.11); *H04N 7/52* (2013.01)

(58) Field of Classification Search
CPC .......................... H04N 19/00; H04N 21/23655
USPC ................................................... 375/240.27
See application file for complete search history.

(56) References Cited

U.S. PATENT DOCUMENTS

| | | | |
|---|---|---|---|
| 7,076,392 B1 * | 7/2006 | Wilson ........................ 702/119 |
| 8,001,486 B2 | 8/2011 | Kumar et al. |
| 8,843,787 B1 | 9/2014 | Foster et al. |
| 2002/0141576 A1 | 10/2002 | Ripley et al. |
| 2004/0179032 A1 | 9/2004 | Huang |
| 2004/0243882 A1 | 12/2004 | Zhou |
| 2005/0117580 A1 | 6/2005 | del Val et al. |
| 2006/0126725 A1 * | 6/2006 | Zeng et al. ............... 375/240.03 |
| 2007/0047411 A1 | 3/2007 | Rivera et al. |
| 2007/0168591 A1 | 7/2007 | Chua |
| 2007/0198595 A1 | 8/2007 | Obata et al. |
| 2008/0071617 A1 | 3/2008 | Ware |
| 2008/0175325 A1 | 7/2008 | Hannuksela et al. |
| 2008/0301588 A1 | 12/2008 | Kumar et al. |
| 2009/0193296 A1 | 7/2009 | Kellington et al. |

(Continued)

OTHER PUBLICATIONS

De Neve et al., "Using Bitstream Structure Descriptions for the Exploitation of Multi-layered Temporal Scalability in H.264/AVC's Base Specification," *Lecture Notes in Computer Science*, vol. 3767, pp. 641-652 (Nov. 2005).

(Continued)

*Primary Examiner* — Andy Rao
*Assistant Examiner* — Obafemi Sosanya
(74) *Attorney, Agent, or Firm* — Sunah Lee; Judy Yee; Micky Minhas

(57) ABSTRACT

Disclosed herein are representative embodiments of methods, apparatus, and systems for manipulating bitstreams of digital media data compressed according to a compression standard. Also disclosed are representative embodiments of methods, apparatus, and systems for evaluating compliance of an encoded bitstream of digital media data with a compression standard. In one exemplary embodiment, a conforming bitstream of compressed digital media data is input. One or more of the parameters in the bitstream are selectively altered into parameters that do not conform to the video compression standard. The selective alteration can be performed such that parameters that would make the bitstream non-decodable if altered are bypassed and left unaltered. A non-conforming bitstream that includes the one or more selectively altered parameters is output.

34 Claims, 9 Drawing Sheets

(56) References Cited

U.S. PATENT DOCUMENTS

| | | |
|---|---|---|
| 2009/0249301 A1 | 10/2009 | Kalla et al. |
| 2010/0150223 A1 | 6/2010 | Nagaraj et al. |
| 2010/0325320 A1 | 12/2010 | Romain et al. |
| 2013/0326302 A1 | 12/2013 | Han et al. |
| 2014/0304303 A1 | 10/2014 | Dalal et al. |

OTHER PUBLICATIONS

Raulet et al., "Validation of Bitstream Syntax and Synthesis of Parsers in the MPEG Reconfigurable Video Coding Framework," *IEEE Workshop on Signal Processing Systems*, pp. 293-298 (Oct. 2008).

Tektronix, Inc."MTS4EA Elementary Stream Analyzer—Compressed Video and Audio Analysis Software Data Sheet," 6 pp. (document marked Feb. 2009).

WebM Project, "Common Algorithm Interface," downloaded from http://www.webmproject.org/tools/vp8-sdk/group_codec.html, 9 pp. (document marked Oct. 28, 2009).

Agama Technologies, "Agama Verifier," downloaded from http://www.agama.tv/pdf/product_brief_verifier.pdf, 2 pp. (document not dated / downloaded Feb. 22, 2013).

Digital Entertainment Content Ecosystem (DECE) LLC, "Common File Format & Media Formats Specification," version 1.0.5, 158 pp. (Oct. 2012).

Ebrahimi et al., "MPEG-4 Natural Video Coding—An Overview," Signal Processing: Image Communication, vol. 15, pp. 365-385 (Jan. 2000).

IMS Global Learning Consortium, Inc., "IMS GLC IWB/CFF Conformance Document," version 1.0 final specification, downloaded from http://www.imsglobal.org/iwbcff/, 10 pp. (Feb. 2012).

ISO/IEC, "Information Technology—Coding of Audio-Visual Objects—Part 12: ISO Base Media File Format," ISO/IEC 14496-12, 120 pp. (Oct. 2008).

ISO/IEC, "Information Technology—Coding of Audio-Visual Objects—Part 14: MP4 File Format," ISO/IEC 14496-14, 18 pp. (Nov. 2003).

ISO/IEC, "Information Technology—Coding of Audio-Visual Objects—Part 15: Advanced Video Coding (AVC) File Format," ISO/IEC 14496-15, 29 pp. (Apr. 2004).

ISO/IEC, "Information Technology—Generic Coding of Moving Pictures and Associated Audio Information: Systems," ISO/IEC 13818-1, 171 pp. (Dec. 2000).

Kim et al., "Conformance Test of Simple Profile MPEG-4 Texture Decoding," Journal of Electronic Imaging, vol. 11, No. 3, pp. 375-380 (Jul. 2002).

M4Scene, "SceneScope—Understand and Meet All MPEG-4/PIFF/3GPP Industry Standards," downloaded from http://www.m4scene.com/product/show?class=SceneScope, 3 pp. (Jun. 2010).

Microsoft Corporation, "Advanced Systems Format (ASF) Specification," revision Jan. 20, 2006, 104 pp. (Jan. 2012).

Microsoft Corporation, "MPEG-4 File Sink," downloaded from http://msdn.microsoft.com, 7 pp. (downloaded Apr. 5, 2013).

Microsoft Corporation, "MPEG-4 File Source," downloaded from http://msdn.microsoft.com, 8 pp. (downloaded Apr. 5, 2013).

MiraVid, Inc., "MiraVid Products: MSight—Specifications," downloaded from www.miravid.com/spec_MSight.html, 5 pp. (document not dated / downloaded Feb. 22, 2013).

Moving Picture Experts Group, "Conformance Testing—MPEG-4 Conformance," MPEG N7649, downloaded from http://mpeg.chiariglione.org/standards/mpeg-4/conformance-testing, 4 pp. (Oct. 2005).

Noe, "Matroska File Format (Under Construction!)," 48 pp. (2009).

Tektronix, Inc., "MPEG Test Systems MTS4SA Data Sheet," 16 pp., downloaded from http://www.tek.com/sites/tek.com/files/media/media/resources/2AW_18759_5_low_res.pdf (Oct. 2008).

Zhang et al., "End-to-end Data Integrity for File Systems: A ZFS Case Study," *Proc. of the 8th USENIX Conf. on File and Storage Technologies*, 14 pp. (Feb. 2010).

\* cited by examiner

BITSTREAM MANIPULATION AND VERIFICATION OF ENCODED DIGITAL MEDIA DATA

FIELD

This application relates to techniques and tools for manipulating and verifying a bitstream of compressed media data, such as media data encoded according to a video compression standard.

BACKGROUND

Video decoders are one of the most complex components in a multimedia playback or trans-coding pipeline. As a system component, the video decoder should be stable and capable of decoding bitstreams of digital media data that have been compressed according to an appropriate compression standard (e.g., H.264/AVC, MPEG-2, MPEG-4, VC-1, or other such standard). A video decoder should also be capable of decoding bitstreams of digital media data that do not fully comply with the relevant compression standard. For example, video decoders desirably decode as much as possible of a non-conforming or non-compliant bitstream and provide an acceptable playback experience. A decoder can be designed to handle such nonconforming bitstreams using error-protection, error-concealment, error correction, or other such error handling techniques.

Non-conforming bitstreams have a number of possible sources. For example, a non-conforming bitstream can be created by an encoder that is slightly faulty or that does not appropriately confine every parameter in a compressed bitstream. Such imperfect encoders are becoming more and more common with the proliferation of consumer electronics that include encoding hardware or algorithms (e.g., digital video cameras, smartphones, and the like). Non-conforming bitstreams can also be created as a result of streaming errors, a user switching channels on a digital TV or on-line streaming service, or by starting playback of a digital video at an unusual point in the bitstream where illegal or invalid parameters may be present (e.g., by skipping to a particular point in a digital video). Non-conforming bitstreams can also be the result of a malicious corruption by a third party. Additionally, there are a wide variety of potential errors in a non-conforming bitstream. The errors can include, for example, one or more of the following: parameter values that are outside the boundaries defined by the compression standard, missing bits or packets, bit flips, chunk inversion, or the presence of additional bits or packets at locations in the bitstream that do not comply with the syntax of the compression standard. To help design video decoders that are robust and able to provide premium playback experiences, it is desirable to test decoders or decoding techniques using non-conforming bitstreams that emulate bitstreams found in the real world or that target specific modules of a decoder.

Bitstream manipulations could be performed completely randomly. However, such a completely random approach is not able to produce a bitstream with a targeted non-conformance and most often will produce a corruption that is not plausible or likely. Accordingly, improved tools and techniques for performing targeted bitstream manipulation are desired.

Encoders should also be designed to produce bitstreams of compressed digital media data that fully comply with the relevant compression standard. Verifying encoders for standard compliance is becoming increasingly important as diverse multimedia content is becoming more easily available to general users. For example, consumers are increasingly creating and editing content from home movies, shared internet videos, and professional movies. Furthermore, users may want to transcode their video content into another format, resolution, bit rate, and/or frame rate in order for the content to be more easily shared among various computer displays, TVs, portable devices, or through the Internet. All of these operations will typically involve an encoder. Although the video decoding process is well defined in various standards (e.g., H.264/AVC, MPEG-2, MPEG-4, VC-1, or other such standard), video encoding processes still allow for a lot of design flexibility so long as the resulting encoded bitstreams are conformant to the corresponding standard. Therefore, a properly designed encoder desirably produces encoded bitstreams that conform to the appropriate standard, provide efficient encoding for the targeted application of the encoder in terms of both quality and performance, and correctly respond to user selected settings. To help evaluate whether an encoder achieves these desired goals, improved techniques and tools for analyzing an encoded bitstream produced by an encoder in development (an encoder under test) for compliance with the appropriate standard are desired.

SUMMARY

Disclosed below are representative embodiments of methods, apparatus, and systems for manipulating bitstreams of digital media data encoded according to a compression standard. Also disclosed are representative embodiments of methods, apparatus, and systems for evaluating compliance of an encoded bitstream of digital media data with a compression standard. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

In some of the disclosed bitstream manipulation embodiments, bitstream manipulation can be performed in a manual or an at least partially automated manner. Furthermore, embodiments of the disclosed technology allow modifications to be made to a bitstream using bitstream specific knowledge. For example, modifications can be made with an awareness from the relevant standard specification of the hierarchical structures and valid value ranges for parameters in the bitstream. As a result of this awareness, the bitstream can be manipulated such that only bitstream elements that are safe (or legal) to be modified are altered, thereby allowing the corner cases that might be experienced by a decoder to be tested. In certain embodiments, manual manipulation of a bitstream is enabled by assembling and displaying the bitstream in a human readable form along with one or more bitstream syntactical guidelines. This allows a user to more easily create various types of non-conformant bitstreams. Using embodiments of the disclosed technology, users can generate different types of plausibly corrupted or non-conformant bitstreams in a quick and automated way without changing the core bitstream structures, syntactical boundaries, or removing any bitstream syntaxes.

In some of the disclosed bitstream analyzer embodiments, encoded bitstreams are analyzed for conformance with a wide variety of international standards, including MPEG-1, MPEG-2, MPEG-4 pt2, VC-1, or H.264/AVC. By examining an encoded bitstream using embodiments of the disclosed bitstream verification embodiments, a user can verify that the encoding techniques executed by the encoder perform as designed and that the encoder reacts to user settings as desired.

The foregoing and other objects, features, and advantages of the invention will become more apparent from the following detailed description, which proceeds with reference to the accompanying figures.

DETAILED DESCRIPTION

I. General Considerations

Figure 1:
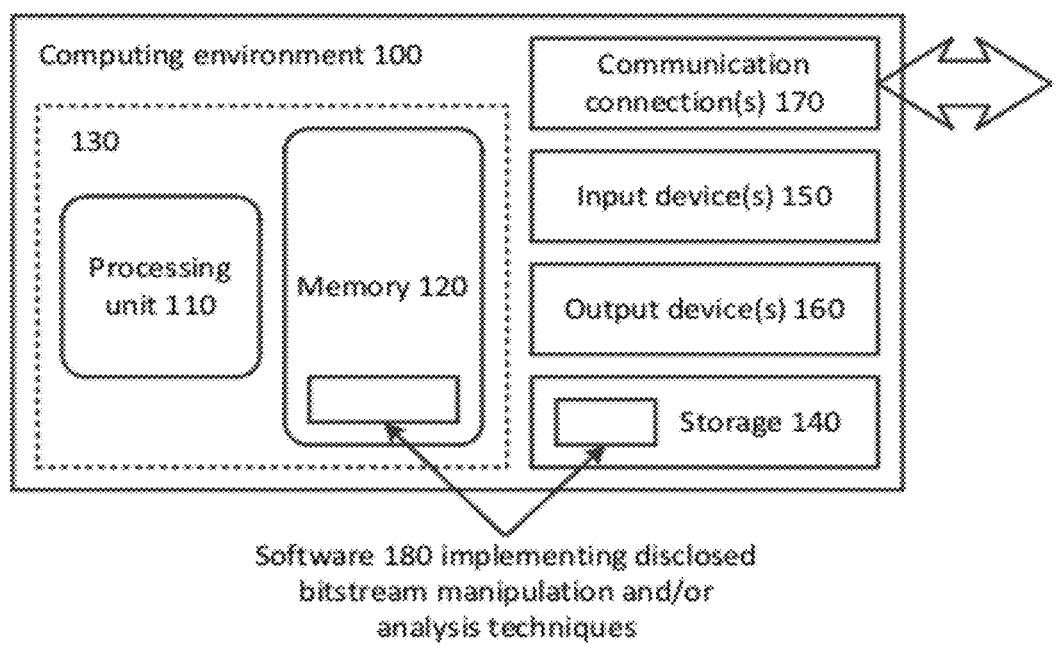
FIG. 1 is a schematic block diagram of a computing environment in which embodiments of the disclosed technology can be implemented.

Disclosed below are representative embodiments of methods, apparatus, and systems for manipulating bitstreams of digital media data encoded according to a compression standard. Also disclosed are representative embodiments of methods, apparatus, and systems for evaluating compliance of an encoded bitstream of digital media data with a compression standard. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems.

The disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed by a computing device (e.g., any commercially available computer or a computer processor embedded in a device, such as a laptop computer, net book, web book, tablet computing device, smart phone, or other mobile computing device). Any of the intermediate or final data created and used during implementation of the disclosed methods or systems can also be stored on one or more computer-readable media (e.g., non-transitory computer-readable media).

For clarity, only certain selected aspects of the software-based embodiments are described. Other details that are well known in the art are omitted. For example, it should be understood that the software-based embodiments are not limited to any specific computer language or program. Likewise, embodiments of the disclosed technology are not limited to any particular computer or type of hardware. Exemplary computing hardware environments suitable for performing any of the disclosed software-based methods are introduced below.

The disclosed methods can also be implemented using specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")) specially designed to implement any of the disclosed methods (e.g., dedicated hardware configured to perform any of the disclosed image processing techniques).

FIG. 1 illustrates a generalized example of a suitable computing hardware environment 100 in which embodiments of the disclosed technology can be implemented. The computing hardware environment 100 is not intended to suggest any limitation as to the scope of use or functionality of the disclosed technology, as the technology can be implemented in diverse general-purpose or special-purpose computing environments.

With reference to FIG. 1, the computing hardware environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 can be volatile memory (e.g., registers, cache, RAM, DRAM, SRAM), non-volatile memory (e.g., ROM, EEPROM, flash memory), or some combination of the two. The memory 120 can store software 180 for implementing one or more of the disclosed bitstream manipulation or analysis techniques. For example, the memory 120 can store software 180 for implementing any of the disclosed methods.

The computing hardware environment can have additional features. For example, the computing hardware environment 100 includes a storage device 140, one or more input devices 150, one or more output devices 160, and one or more communication connections 170. An interconnection mechanism (not shown) such as a bus, controller, or network interconnects the components of the computing hardware environment 100. Typically, operating system software (not shown) provides an operating environment for other software executing in the computing hardware environment 100, and coordinates activities of the components of the computing hardware environment 100.

The storage device 140 is a type of non-volatile memory and can be removable or non-removable. The storage device 140 includes, for instance, magnetic disks (e.g., hard drives), magnetic tapes or cassettes, optical storage media (e.g., CD-ROMs or DVDs), or any other tangible non-transitory storage medium that can be used to store information and which can be accessed within or by the computing hardware environment 100. The storage device 140 can also store the software 180 for implementing any of the described techniques.

The input device(s) 150 can be a touch input device, such as a keyboard, mouse, touch screen, pen, trackball, a voice input device, a scanning device, or another device that provides input to the computing environment 100. The output device(s) 160 can be a display device, touch screen, printer, speaker, CD-writer, or another device that provides output from the computing environment 100.

The communication connection(s) 170 enable communication over a communication medium to another computing entity. The communication medium conveys information such as computer-executable instructions, any of the intermediate or final messages or data used in implementing embodiments of the disclosed technology. By way of example, and not limitation, communication media include wired or wireless techniques implemented with an electrical, optical, RF, infrared, acoustic, or other carrier.

The various methods disclosed herein (e.g., any of the disclosed bitstream manipulation or analysis techniques) can be described in the general context of computer-executable instructions stored on one or more computer-readable media (e.g., tangible non-transitory computer-readable media, such as memory 120 and storage device 140). The various methods disclosed herein can also be described in the general context of computer-executable instructions, such as those included in program modules, being executed by a processor in a computing environment. Generally, program modules include routines, programs, libraries, objects, classes, components, data structures, etc. that perform particular tasks or implement particular abstract data types. The functionality of the program modules may be combined or split between program modules as desired in various embodiments. Any of the disclosed methods can also be performed using a distributed computing environment (e.g., a client-server network, cloud computing environment, wide area network, or local area network).

II. Exemplary Bitstream Manipulation Tools and Techniques

A. Introduction

In order to efficiently test decoders for security, robustness, and non-conformant bitstream playback, embodiments of the disclosed bitstream manipulation techniques parse an input bitstream, modify the bitstream, and recreate a corrupted or non-conformant bitstream. In particular implementations, the bitstream modification is performed in a partially automated manner (e.g., using some general guidance provided by the user) or through specific user inputs. Embodiments of the disclosed techniques can create non-conformant bitstreams that recreate or emulate the most dangerous, but plausibly corrupted, contents in a bitstream. As a result, test bitstreams can be created that stress a decoder as much as possible. For example, embodiments of the bitstream manipulation techniques described herein can be used to create test bitstreams that test the corner cases that might be experienced by a decoder. Embodiments of the bitstream manipulation techniques can also be used to create bitstreams that emulate bitstreams created by any third-party encoder. By generating bitstreams using the bitstream manipulation tool, any content licensing issues that may surround the use of bitstreams actually produced by third-party encoders can be avoided.

Although decoders may have somewhat different components (or modules), a decoder typically comprises the following, in the sequential order in which they operate: (a) a sequence parameter parser, (b) a picture parameter parser, (c) a slice header parser, (d) a slice data parser, (e) an inverse discrete cosine transform component, (f) a motion compensation reconstruction component, (g) an intra-reconstruction component, and (h) a deblocking component.

During real-world use of a decoder, any of the components in a decoder could be attacked or affected by bitstream corruption. Accordingly, bitstreams used to test a decoder desirably target and individually test each of the components as much as possible. Furthermore, some components of the decoder can be implemented in hardware. For example, certain hardware-accelerated decoder architectures (e.g., DXVA Variable Length Decoding, DXVA Motion Compensation, or DXVA IDCT) use specialized hardware for implementing at least some of the decoding components. For example, DXVA Motion Compensation uses hardware to implement the motion compensation reconstruction component, the intra-reconstruction components, and the deblocking component. DXVA IDCT uses hardware to implement the inverse discrete cosine transform component, the motion compensation reconstruction component, the intra-reconstruction components, and the deblocking component. DXVA Variable Length Decoding uses hardware to implement the slice data parser component, the motion compensation reconstruction component, the intra-reconstruction components, and the deblocking component.

For any decoder, it is desirable to use test bitstreams that test and stress the components used not only in the early stages of decoding but also in the later stages of decoding (e.g., the inverse discrete cosine transform component, the motion compensation reconstruction component, the intra-reconstruction components, and the deblocking component). Thus, a bitstream manipulation technique desirably has the flexibility and bitstream awareness to allow the bitstream to be modified in a way that specifically targets these later-stage components. Such capability can be especially desirable when testing different profiles in a decoder, where the profile differences mainly concern operations performed in the later stages of decoding. In some sense, the farther the bitstream is able to go through the component chain, the more dangerous the bitstream is, and the more desirable it is for such a bitstream to be tested during the decoder design process.

B. Exemplary Bitstream Manipulation Embodiments

Figure 2:
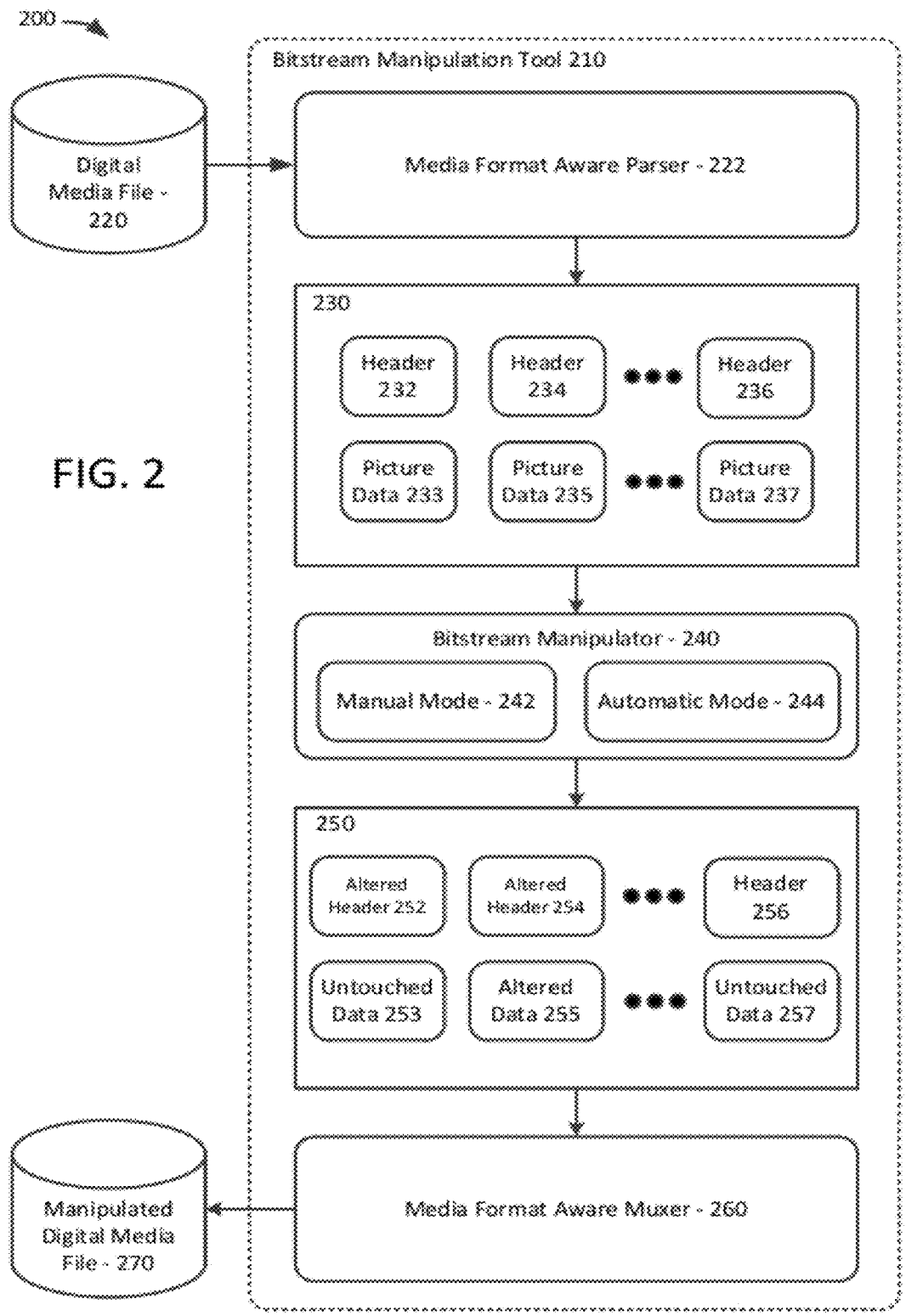
FIG. 2 is a schematic block diagram showing the components and overall flow for a bitstream manipulation process in accordance with an exemplary embodiment of the disclosed technology.

FIG. 2 is a schematic block diagram 200 illustrating the components and flow of an exemplary embodiment of a bitstream manipulation tool 210 according to the disclosed technology. The particular components shown in FIG. 2 should not be construed as limiting, however, as the illustrated components can be used alone or in various combinations and subcombinations with one another. Similarly, the illustrated actions shown in FIG. 2 can be performed alone or in various combinations and subcombinations with one another.

In FIG. 2, a file storing encoded digital media data 220 is input (e.g., buffered into memory or otherwise loaded for manipulation) to an exemplary embodiment of the bitstream manipulation tool 210. The digital media data can be, for example, an unmodified encoded bitstream compressed according to a known compression standard (e.g., H.264/AVC, MPEG-2, MPEG-4, VC-1, or other such standard). Thus, the bitstream can be a bitstream that conforms to a particular standard. The bitstream can be a test bitstream or can be generated from a variety of sources (e.g., from an encoder encoding a live video stream).

As shown in FIG. 2, the digital media data 220 is input into a media format aware parser 222. In the illustrated embodiment, the media format aware parser 222 analyzes the encoded digital media data 220 and parses the data into data structures that correspond to the various syntactical elements specified in the corresponding video compression specification. For example, the media format aware parser 222 can parse the digital media data into structures that include the various headers and parametric data associated with each of the headers (sometimes referred to as the header data). The media format aware parser 222 can also parse the digital media into structure that include picture data. As illustrated, the header data can be arranged into a separate structure corresponding to the particular hierarchical level of the header in the encoded bitstream. For example, the header and parametric data for the fields in the header can be arranged into a structure associated with any one or more of the following hierarchical levels: the sequence (or stream) level, the picture level, the slice level, the macroblock level, the block level, or the sub-block level. In other words, the media format aware parser 222 can identify the syntactical boundaries of the bitstream and generate structures that appropriately organize the data according to the hierarchical levels defined in the corresponding compression standard.

Figure 3:
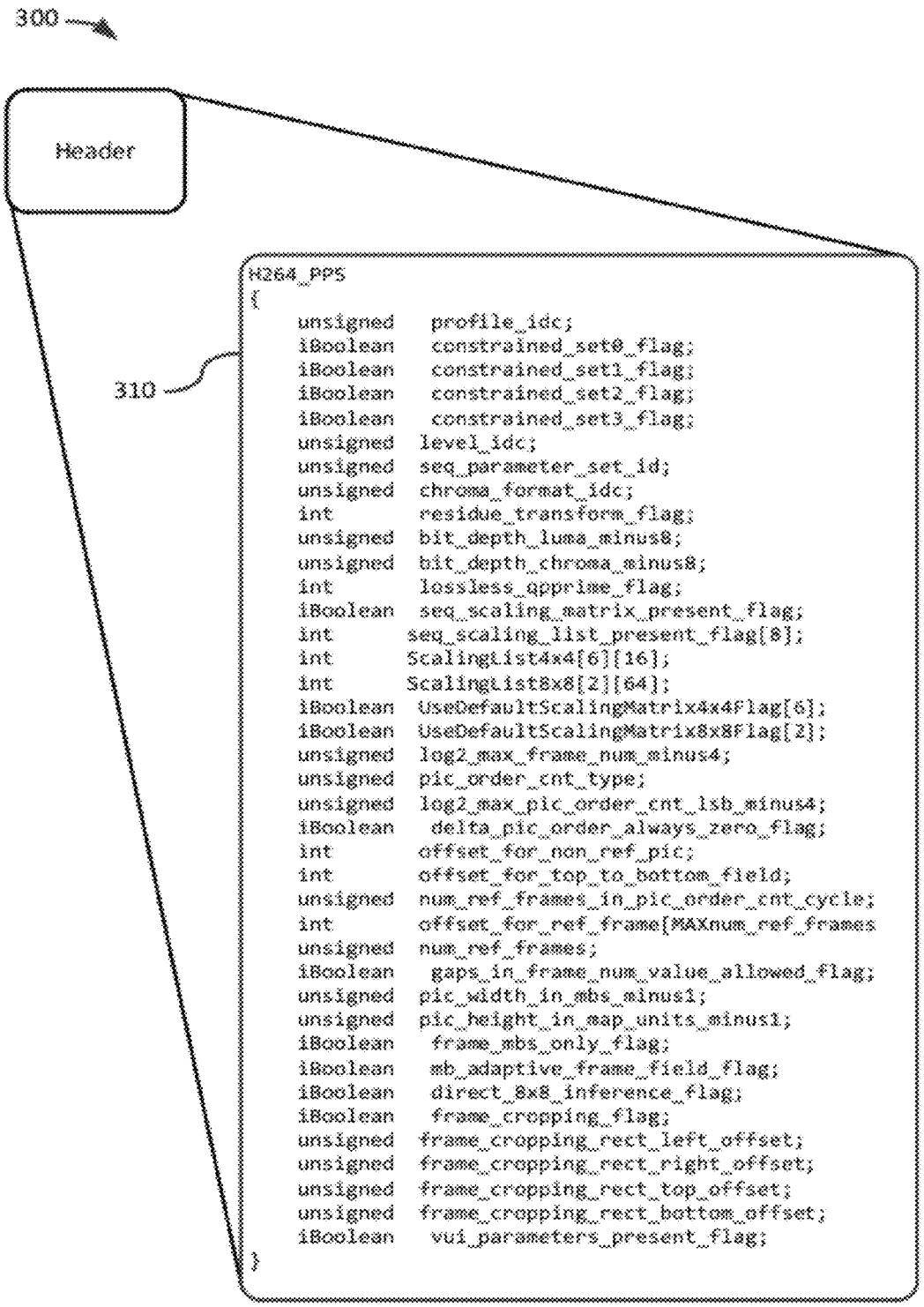
FIG. 3 is a representation illustrating operation of a format aware parser as may be used with the exemplary bitstream manipulation embodiment of FIG. 2.

FIG. 3 is a representation 300 showing an exemplary data structure 310 according to which the data from the input bitstream can be arranged. In particular, FIG. 3 shows an exemplary data structure 310 for the picture parameter set ("PPS") from an H.264 bitstream that identifies the parameters along with their variable type. During the parsing process, the exemplary data structure can be populated with the corresponding values identified in the input bitstream, thereby resulting in a data structure that corresponds to the appropriate syntactical element (syntactical structure) defined by the corresponding compression standard.

Further examples of the structures that can be generated and populated using an embodiment of the media format aware parser 222 are shown in Appendix A. In particular, Appendix A shows exemplary data structures that can be generated by the media format aware parser 222 for headers in bitstreams encoded according to the H.264, MPEG-1, MPEG-2, WMV-9, MPEG-4 part 2, and VC-1 standards. As more fully explained below, Appendix A also identifies whether and how the identified header parameters can be altered according to one particular implementation of the disclosed technology.

Returning to FIG. 2, representation 230 illustrates header data 232, 234, 236 identified and parsed by the media format aware parser 222. Each of header data 232, 234, 236 includes an identification of the header type and the values of the parameters associated with the fields of the header. Each of header data 232, 234, 236 can have the form of a data structure similar to that in FIG. 3 or listed in Appendix A. Representation 230 also illustrates picture data 233, 235, 237 from the bitstream. The picture data 233, 235, 237 typically comprises values associated with the particular image to be compressed (e.g., luminance and chrominance values, motion compensation values, and the like) rather than values associated with the operational settings of the decoder. Although representation 230 shows picture data being associated with each item of header data, there may be multiple header data structures before a single picture data structure.

As illustrated in FIG. 2, bitstream manipulator 240 operates on the parsed digital media data and alters one or more aspects of the digital media data. In the illustrated embodiment, the bitstream manipulator 240 can operate in at least two modes: a manual mode 242 and an at least partially automatic mode 244. In other embodiments, the bitstream manipulator 240 includes additional modes or just one of the modes. In operation, the user can select from among the available modes, such as the manual or the partially automatic mode. The operation of an exemplary manual mode and an exemplary partially automatic mode are described in more detail in FIGS. 4-5 and the accompanying text. In certain embodiments of the bitstream manipulator, the bitstream manipulator selectively alters the parameters or other aspects of the bitstream in a targeted fashion such that the desired components of a decoder are tested. For example, the parameters that are altered by the bitstream manipulator can be selected so that parameters that would make the bitstream non-decodable are bypassed. Otherwise, the resulting non-conforming bitstream may cause the decoder to fail before the targeted component is tested.

Representation 250 in FIG. 2 illustrates the header data and picture data from representation 230 as altered by the bitstream manipulator 240. In particular, representation 250 illustrates various manners in which the header data and picture data can be altered. For example, the header data can be altered without altering any picture data following the header data, as shown by altered header data 252 and untouched picture data 253. Header data can also be altered along with picture data, as shown by altered header data 254 and altered picture data 255. Both the header data and the picture data can remain unaltered, as shown by unaltered header data 256 and unaltered picture data 257. Additionally, header data can be unaltered while the picture data can be altered (not shown).

As shown in FIG. 2, media format aware multiplexer 260 operates to recombine and arrange the altered digital media data into a bitstream format. In particular embodiments, the re-combined data is arranged to have the same format as the encoded digital media data 220. However, because the digital media data has been altered, the resulting bitstream is a bitstream that no longer conforms to the compression standard according to which the bitstream was encoded. In particular embodiments, the syntactical boundaries and structure of the original bitstream are maintained. In other embodiments, however, and as more fully explained below, portions of the bitstream are re-arranged so as to violate the syntactical boundaries defined by the standard.

Figure 4:
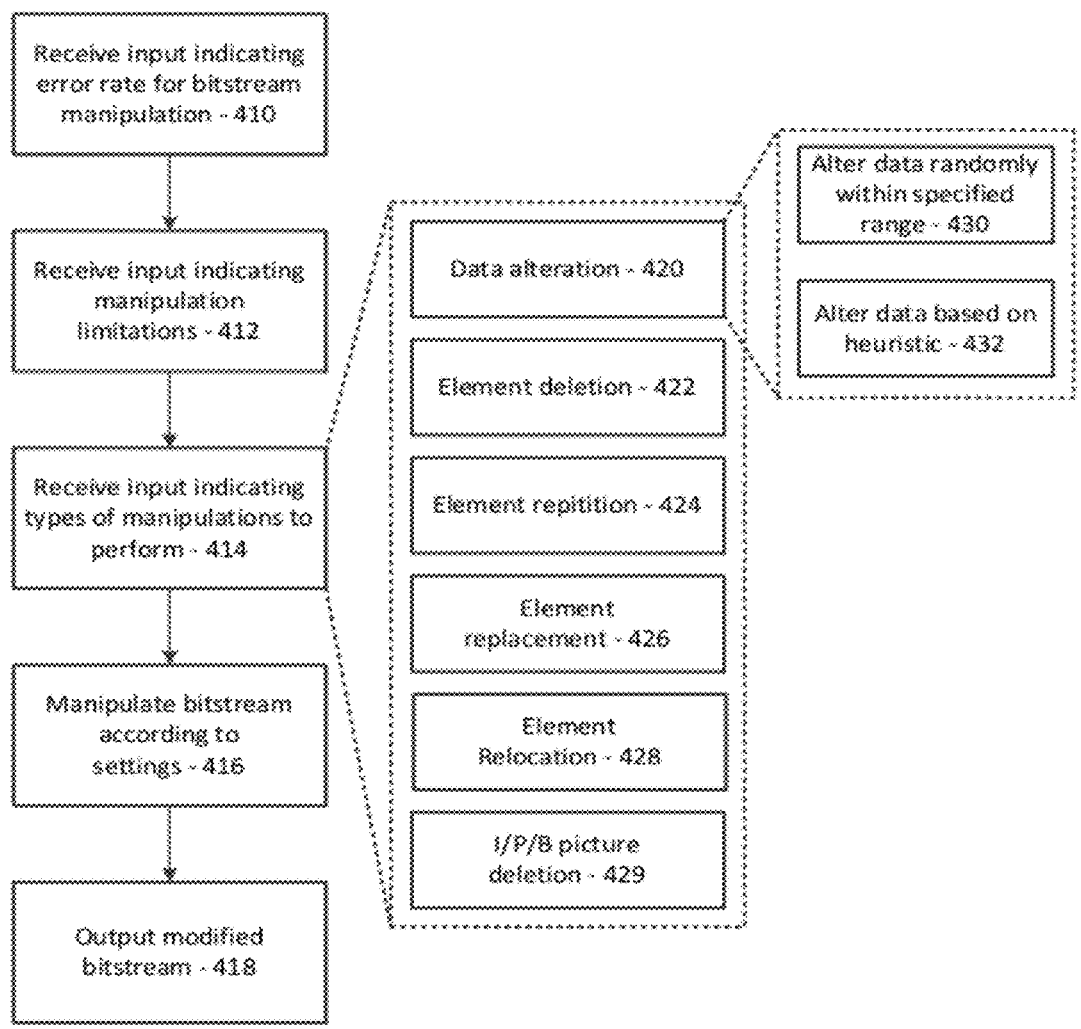
FIG. 4 is a flow chart and block diagram illustrating operation of an automated mode for bitstream manipulation as can be performed in the exemplary bitstream manipulation embodiment of FIG. 2.

FIG. 4 is a flow chart 400 of an exemplary method for manipulating a bitstream using an at least partially automated technique according to the disclosed technology. The embodiment shown in FIG. 4 should not be construed as limiting, however, as any of the disclosed method acts can be performed alone or in combination or subcombination with one another. Furthermore, the disclosed method acts can be performed along with one or more other method acts not shown. The method shown in FIG. 4 can be performed, for example, when a user selects to perform bitstream manipulation using an automatic mode, as shown at 244 of FIG. 2.

At process block 410, input is received indicating an error rate for altering elements of the bitstream. In certain embodiments, the error rate refers to a probability of alteration. For example, an error rate of "100" can indicate that 100% of the elements are to be altered, whereas an error rate of "10" can indicate that 10% of the elements are to be altered. Furthermore, when the bitstream manipulation is performed, the bitstream manipulator can evaluate each valid element in the bitstream individually and make an initial determination of whether the element is to be altered based on the error rate. In other words, for individual elements to be altered in the bitstream, a threshold determination of whether to alter the element can be performed using the error rate received at process block 410. For instance, the error rate might be compared to a random number (e.g., a random number between 1 and 100) drawn for each parameter or group of parameters under consideration to determine whether alteration of the bitstream parameter or group of parameters is to be altered. Because the error rate corresponds to a probability of alteration in embodiments of the disclosed technology, the modified bitstreams that are produced as a result of the method shown in FIG. 4 will be different each time the bitstream manipulation process is performed. The error rate can be input through a variety of mechanisms, such as through a suitable graphic user interface or through a command line entry. In other embodiments, the error rate is predetermined or selected randomly.

At process block 412, input is received indicating limitations on the syntactical elements (syntactical structures) or bitstream parameters that are to be altered. In certain embodiments, for example, input is received indicating which syntactical structures are to be available for possible alteration in the bitstream and which syntactical structures are to be bypassed and left unmodified. For instance, input could be received indicating that only parameters at one or more of the following hierarchical levels are to be candidate parameters for bitstream alteration: the sequence level, the picture level, the slice level, the macroblock level, or the block level. In other embodiments, input can be received about which alterations to make on the parameter level. For example, in some implementations, the user can select the specific parameters to be altered or bypassed in the bitstream. In further embodiments, the user can select not only which parameters or structures to alter, but can also indicate whether the alterations are to be limited to valid values or include invalid values. By allowing the bitstream manipulation process to be customized, modified bitstreams can be generated that specifically target particular components of a decoder. For example, by selecting only the parameters associated with deblocking for alteration, a modified bitstream can be generated using the method shown in FIG. 4 that is capable of testing the deblocking components in a decoder.

At process block 414, input is received indicating which types of bitstream manipulations are to be performed. In certain embodiments, the bitstream manipulator is capable of performing different types of bitstream manipulations. For example, any one or more of the following bitstream manipulations can be available in the bitstream manipulation process 400: data alteration 420, element deletion 422, element repetition 424, element replacement 426, element relocation 428, or picture deletion 429.

Data alteration 420 involves modifying the value of one or more parameters of a syntactical element (e.g., any of the syntactical elements shown as data structures in Appendix A).

In particular implementations, the data alteration is performed in an intelligent manner, with knowledge of the structure being modified. For example, for a given parameter in the bitstream, one or more of the following can be determined: a valid range for the parameter, a possible range for the parameter that includes invalid values (e.g., ranges that exceed the valid range but which are still possible given the bit size of the parameter), parameter interdependencies, and recommended alterations. This information can then be used to guide the data alteration process. For example, for a given parameter in the bitstream, a heuristic based on previous analysis can be developed and used to determine how best to alter the parameter for decoder testing purposes. Furthermore, a particular alteration (e.g., enabling a flag) may require additional parameters to be set that were not previously present in the original bitstream. Such dependencies can be recognized and specified by a heuristic. The valid ranges, invalid ranges, parameter interdependencies, and heuristics for altering data can be stored in a data file that is accessed during the bitstream manipulation process or can be coded into the computer-executable instructions that implement the bitstream manipulator. In particular implementations, for a given parameter to be altered, the new value can be selected randomly within a specified range 430 (e.g., randomly within the valid range for the parameter, or randomly within the invalid range for the parameter) or be selected according to a heuristic 432 (e.g., altered in a predetermined manner) if a heuristic is available.

Element deletion 422 involves the deletion of one or more selected syntactical elements of the bitstream. For example, for an H.264 bitstream, a picture header may be deleted, leaving all the following slices referring to a non-existence picture header. Or, for example, individual slices of a picture can be left out. The determination of which syntactical elements to drop can be randomly selected or can be guided by the user. For example, in certain embodiments, the user is able to select which syntactical elements of the bitstream are available for possible deletion. The syntactical elements to be deleted can be selected from any one or more of the following hierarchical levels: the sequence level, the picture level, the slice level, the macroblock level, or the block level. Furthermore, for any given syntactical element, an evaluation can be made using the error rate to determine whether the syntactical element is to be deleted.

Element repetition 424 involves the repetition of selected syntactical elements of the bitstream. For example, for an H.264 bitstream, a picture header can be repeated. Or, duplicate slices of a picture can be inserted into the bitstream. The repeated syntactical element can be randomly inserted into the bitstream, or located at a recommended position (e.g., at a position known to possibly occur during real-world implementation). The determination of which syntactical elements to repeat and/or the position in the bitstream of the repeated element can be randomly selected or can be guided by the user. For example, in certain embodiments, the user is able to select which syntactical elements of the bitstream are available for possible repetition. The syntactical elements to be repeated can be selected from any one or more of the following hierarchical levels: the sequence level, the picture level, the slice level, the macroblock level, or the block level. Furthermore, for any given syntactical element, an evaluation can be made using the error rate to determine whether the syntactical element is to be repeated.

Element replacement 426 involves the replacement of selected syntactical elements of the bitstream with modified versions of the syntactical pieces. Element replacement is similar to data alteration, but, in certain embodiments, replaces entire syntactical pieces with other pieces. The replacement syntactical elements can come from a variety of sources, including from other syntactical elements in the bitstream or by generating a modified version. The determination of which syntactical elements to replace can be randomly selected or can be guided by the user. For example, in certain embodiments, the user is able to select which syntactical elements of the bitstream are available for possible replacement. The syntactical elements to be replaced can be selected from any one or more of the following hierarchical levels: the sequence level, the picture level, the slice level, the macroblock level, or the block level. Furthermore, for any given syntactical element, an evaluation can be made using the error rate to determine whether the syntactical element is to be replaced.

Element relocation 428 involves the relocation of selected syntactical elements of the bitstream to other locations in the bitstream. The relocated syntactical element can be randomly inserted into the bitstream, or located at a recommended position (e.g., at a position known to possibly occur in during real-world implementation). The determination of which syntactical elements to relocate and/or the position in the bitstream for the relocated element can be randomly selected or can be guided by the user. For example, in certain embodiments, the user is able to select which syntactical elements of the bitstream are available for possible relocation. The syntactical elements to be relocated can be selected from any one or more of the following hierarchical levels: the sequence level, the picture level, the slice level, the macroblock level, or the block level. Furthermore, for any given syntactical element, an evaluation can be made using the error rate to determine whether the syntactical element is to be relocated.

Picture deletion 429 involves deleting selected pictures from the bitstream. For example, any one or more an I frame, P frame, or B frame can be deleted from the bitstream, creating a partially incomplete bitstream. The type of picture to delete can be randomly selected or can be guided by the user. Furthermore, for any given picture, an evaluation can be made using the error rate to determine whether the picture is to be deleted.

The above-described bitstream manipulations should not be construed as limiting, as additional or supplemental manipulations can also be available for use in embodiments of the disclosed technology. Furthermore, although the embodiment disclosed above describes a single error rate, additional error rates can be received (e.g., via user input) and can be associated with each particular type of bitstream manipulation to be performed. For example, data alteration 420 can be performed according to a first error rate, whereas element repetition 424 (or nay one or more of the other alterations) can be performed according to a second error rate.

At process block 416, bitstream manipulation is performed according to the input received at process blocks 410, 412, 414. In particular embodiments, and as specified by the input at 414, one or more of the following types of bitstream manipulations are performed in the manner described above: data alteration 420, element deletion 422, element repetition 424, element replacement 426, element relocation 428, or picture deletion 429. In certain embodiments, data alteration is performed before any of the other bitstream manipulations. In some embodiments, data alteration is performed only on certain permissible parameters in the parsed bitstream. For example, the parameters identified in each structure of the parsed bitstream can be classified into parameters that are permissibly changed without making the bitstream undecodable and parameters that would make the bitstream undecodable if changed (parameters that would "break" the bitstream if altered). Data alteration can then be performed only on those parameters that are permissibly changed without making the bitstream non-decodable. A data file indicating which parameters in structures of a parsed bitstream can be modified and which parameters cannot be modified without making the bitstream non-decodable can be stored and accessed during the bitstream manipulation at process block 416. Alternatively, the classifications of the parameters can be coded into the computer-executable instruction implementing the bitstream manipulator.

Figure 5:
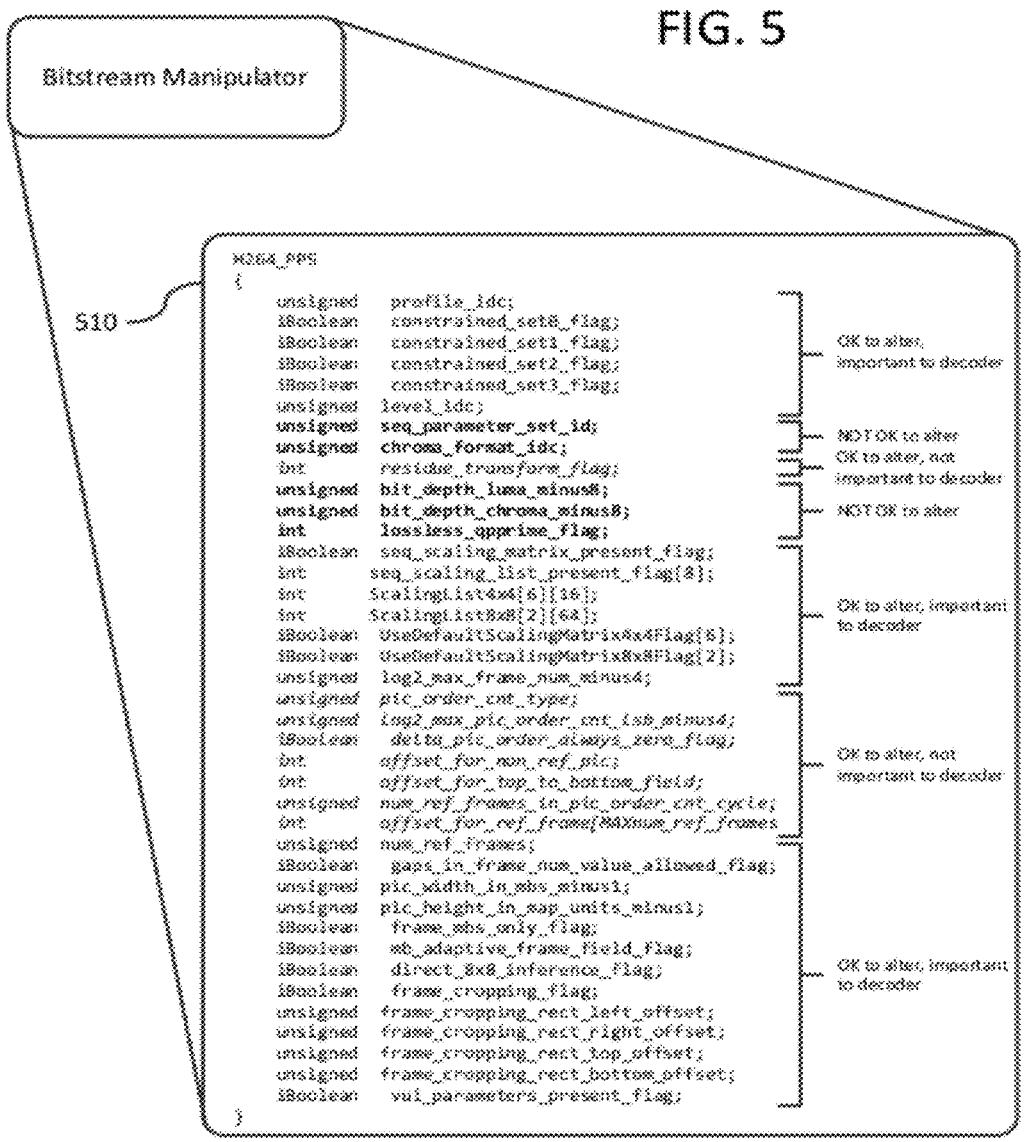
FIG. 5 is a representation illustrating how bitstream manipulation can be performed in a media format aware manner in embodiments of the disclosed technology.

FIG. 5 is a representation 500 of a parsed bitstream structure 510 in which the parameters are classified into different classifications. In particular, representation 500 shows the parameters in a structure 510 for the picture parameter set ("PPS") from a parsed H.264 bitstream. Representation 500 shows that the parameters are classified into three different classifications: (1) a first classification indicating that the parameters are permissible parameters to change for the decoder and are useful in testing the decoder (shown in regular font and indicated as "OK to alter, useful to testing decoder"), (2) a second classification indicating that the parameters are permissible parameters to change for the decoder but which are not useful in testing the decoder (shown in italicized font and indicated as "OK to alter, not useful to testing decoder"), and (3) a third classification indicating that the parameters are not recommended parameters to change for the decoder and could render the bitstream undecodable if altered (shown in bold font and indicated as "NOT OK to alter"). The classifications can be predetermined through previous analysis and testing of bitstream manipulations. A data file storing the information shown in representation 500 can be stored and accessed during bitstream manipulation at process block 416 so that parameters that can "break" the bitstream are bypassed during the bitstream manipulation process. Alternatively, the information about the classifications of the parameters can be coded into the computer-executable instruction implementing the bitstream manipulator. In certain embodiments, only those parameters that are useful in testing the decoder are altered. In other embodiments, both the parameters that are permissibly altered and useful in testing the decoder and the parameters that are permissibly altered but not useful in testing the decoder are altered.

As noted, Appendix A shows exemplary data structures that can be generated by the media format aware parser 222 for headers in bitstreams encoded according to the H.264, MPEG-2, WMV-9, MPEG-4 part 2, and VC-1 standards. Appendix A also identifies the classifications of each parameter according to the classifications introduced above. In particular, Appendix A shows a first classification indicating that the parameters are permissible parameters to change for the decoder and are useful in testing the decoder (shown in regular font), a second classification indicating that the parameters are permissible parameters to change for the decoder but which are not useful in testing the decoder (shown in italicized font), and a third classification indicating that the parameters are not recommended parameters to change for the decoder and could render the bitstream undecodable if altered (shown in bold font).

In particular implementations, the parameters of the parsed bitstream are considered in a single pass through the parsed bitstream. As each parameter is evaluated, a determination is first made as to whether the parameter is one selected by the user to alter or belongs to a syntactical element (syntactical structure) selected for alteration. This determination can be made, for example, using the data received at process block 412. If the parameter is available for alteration, then a determination can be made as to whether the parameter is one that is permissibly altered. This determination can be made, for example, by evaluating a parameter relative to data indicating the classification of the parameter as a parameter that is permissibly altered or a parameter that is not recommended for alteration. As noted this data can be stored in a data file or coded into the computer-executable instructions implemented the bitstream manipulator. If the parameter is permissibly altered, a further determination can be made as to whether data alteration is to be performed. For example, a determination can be made using a probability of alteration as determined by a selected error rate. For example, the error rate received at process block 410 can be used. If it is determined that the parameter is to be altered, then parameter alteration can occur, either randomly within a valid range, randomly within a permissible but invalid range, or according to a predetermined heuristic. The bitstream manipulation process 416 can continue until the parameters of the bitstream are all evaluated for possible manipulation. In particular embodiments, after data alteration is performed, the other types of bitstream manipulation can be performed as described above.

At process block 418, a modified bitstream altered according to the bitstream is output from the bitstream manipulator. For example, the modified bitstream can be stored on one or more non-tangible computer-readable media.

Using embodiments of the disclosed technology, it is possible to make changes to sequence parameters, picture parameters and/or slice parameters. The resulting changes can introduce values outside of the valid ranges or can be within the valid ranges for the parameters, thereby allowing the bitstreams to be used to exercise later stages of a decoder. Furthermore, duplicate packets of data can be introduced into the bitstream. For example, duplicate legal packets of NALUs (as in the H.264 or MPEG2 standard) or BDUs (as in the VC-1 standard) can be generated and inserted into random places. In such manipulations, each individual unit is still valid, but the inter-relationship among units is unexpected. Furthermore, flags can be modified inside of structures and data created that was previously non-existent in the original bitstream. Additionally, parameters in certain parameter sets (e.g., the sequence parameters set ("SPS")) can be changed on purpose. Targeted non-compliant syntactic elements generated by embodiments of the disclosed bitstream manipulator can be used to robustly test a decoder. Furthermore, bitstreams that have a different source content and profile/level type can also be created using embodiments of the disclosed technology.

Figure 6:
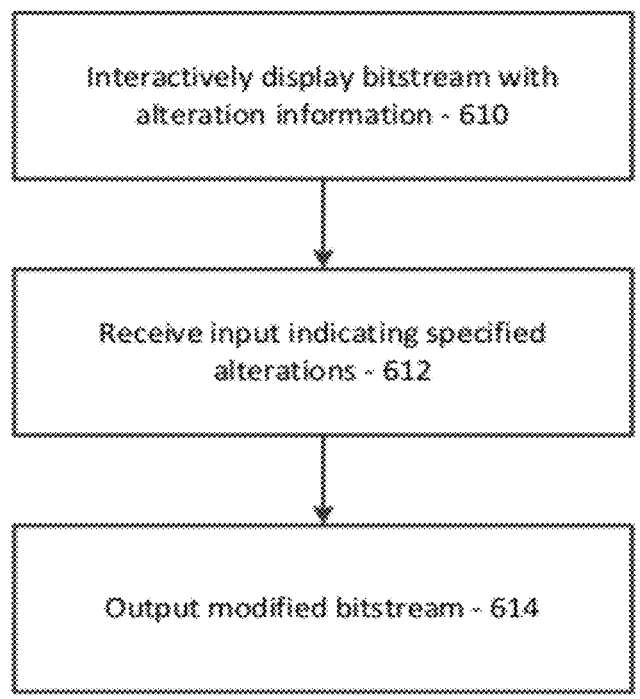
FIG. 6 is a flow chart illustrating operation of an exemplary manual mode for bitstream manipulation as can be performed in the exemplary bitstream manipulation embodiment of FIG. 2.

FIG. 6 is a flow chart 600 of an exemplary method for manipulating a bitstream using a manual technique according to the disclosed technology. The embodiment shown in FIG. 6 should not be construed as limiting, however, as any of the disclosed method acts can be performed alone or in various combinations or subcombinations with one another. Furthermore, the disclosed method acts can be performed along with one or more other method acts not shown. The method shown in FIG. 6 can be performed, for example, when a user selects to perform bitstream manipulation using a manual mode, as shown at 242 of FIG. 2.

At process block 610, data from the parsed bitstream (e.g., from the media format aware parser 222) is displayed to the user. In certain implementations, the data from the parsed bitstream is further transformed into another representation making display and user manipulation more easily performed (e.g., an XML representation). Furthermore, in the illustrated embodiment, the data is displayed in an interactive fashion. For example, the data from the parsed bitstream can be displayed to the user in a fashion that informs the user of whether a displayed parameter is permissibly altered and useful in testing a decoder or whether the displayed parameter is not recommended for alteration (e.g., because the parameter may alter the bitstream into a modified bitstream that is undecodable). In particular implementations, for example, the parameters of the parsed bitstream displayed to a user include an indication of a classification of the parameters. In certain implementations, the classification include one or more of the following: a first classification indicating that the parameters are permissible parameters to change for the decoder and are useful in testing the decoder, a second classification indicating that the parameters are permissible parameters to change for the decoder but which are not useful in testing the decoder, and a third classification indicating that the parameters are not recommended parameters to change for the decoder and could render the bitstream undecodable if altered. The indication of the classification can be displayed in a variety of manners. For example, the classifications can be indicated by showing the parameters in different colors, fonts, pop-up windows that appear when the user floats their cursor over a parameter, or other indication mechanism.

Figure 7:
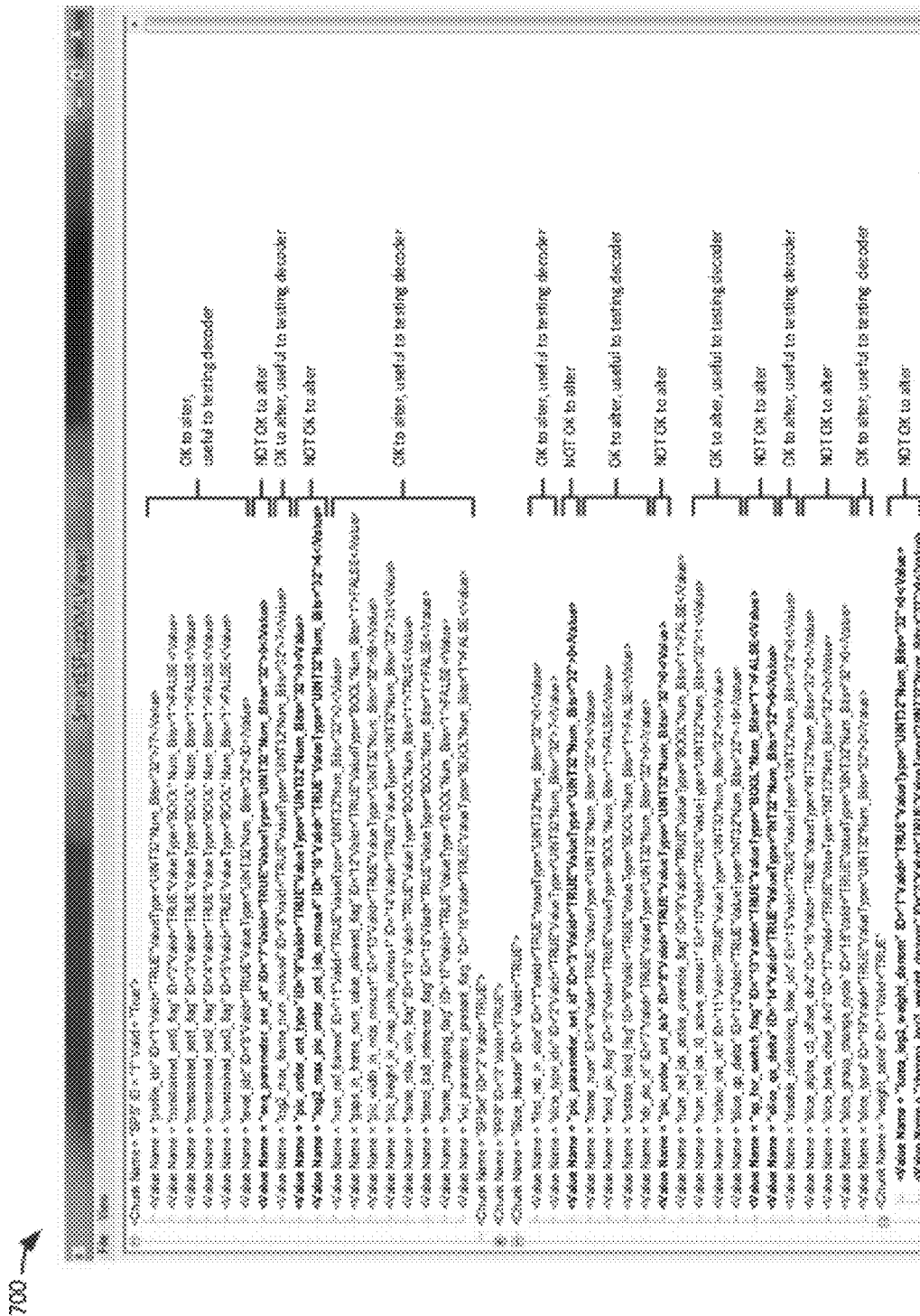
FIG. 7 is a screenshot showing an exemplary manner in which parameters of a bitstream can be displayed to a user for possible alteration as part of the manual mode for bitstream manipulation illustrated in FIG. 6.

FIG. 7 is a screenshot 700 of one exemplary manner in which information about the parameters can be displayed. In screenshot 700, the data structures resulting from the media format aware parser 222 are displayed in a hierarchical manner, such that each data structure can be expanded to show its constituent parameters. Furthermore, in certain embodiments, the parameters can be highlighted in different colors to indicate whether they are permissible for alteration or not recommended for alteration. For ease of illustration, FIG. 7 includes brackets indicating whether parameters are recommended for alteration or whether parameters are not recommended for alteration (in which case the parameters are also shown in bold type). In particular, FIG. 7 shows a first classification indicating that the parameters are permissible parameters to change for the decoder and are useful in testing the decoder (indicated as "OK to alter, useful to testing decoder") and a second classification indicating that the parameters are not recommended parameters to change for the decoder and could render the bitstream undecodable if altered (indicated as "NOT OK to alter"). A further classification indicating that the parameters are permissible parameters to change for the decoder but which are not useful in testing the decoder is not shown, but could be used in other embodiments of the disclosed technology.

In certain embodiments, additional information is displayed to the user. For example, in particular embodiments, information about one or more of the following can be displayed to the user: the range of valid values for the parameter, the range of permissible values for the parameter (including valid and invalid values), recommended alterations of the parameter, information about the interdependency of the parameter with other parameters, or a description of the parameter and its purpose. This information can be created through a previous analysis of the specification and previous testing using bitstream manipulations. This additional information can be displayed to the user in a variety of manners. For instance, in certain embodiments, this information can appear to the user in a pop-up box when the user selects a parameter (e.g., by double clicking) or can appear automatically when the user floats their cursor over a parameter. This additional information can serve as a useful guide to the user when manually altering the bitstream and creating a modified bitstream.

At process block 612, input is received concerning the desired bitstream manipulations. The input can be received in a variety of manners. For example, the desired bitstream manipulations can be input through one or more of the following mechanisms: directly by the user after selecting the desired parameter to change, through a pull-down menu indicating the possible valid or invalid values for a selected parameter, or randomly upon the user selecting the desired parameter.

At process block 614, a modified bitstream altered according to the bitstream is output from the bitstream manipulator. The modified bitstream can be stored, for example, on one or more non-tangible computer-readable media.

III. Exemplary Bitstream Analysis Tools and Techniques

A. Introduction

Although the video decoding process is well defined in various standards (e.g., MPEG-1, MPEG-2, MPEG-4 pt2, VC-1 and H.264/AVC), the corresponding encoders are less rigidly defined and have a lot of implementation flexibility so long as the resulting encoded bitstreams conform to the appropriate standard. An encoder is desirably designed so that it produces an encoded bitstream that conforms to the appropriate standard, performs the encoding in an efficient manner without sacrificing performance or quality, and correctly responds to user settings.

More specifically, as a good video encoder, the encoded video bitstream generated by an encoder should be conformant to the specifications of the corresponding video compression standard. As more fully explained below, embodiments of the disclosed bitstream analysis tool can evaluate syntax parameters in a video bitstream against the valid ranges from the corresponding video compression standard. When a syntax parameter is out of the valid range, embodiments of the bitstream analysis tool can identify the appropriate section of the specification and further indicate the range of valid values. The parameters that are evaluated can be from any of the hierarchical levels of the compression standard, including one or more of the following: the sequence level, the picture level, the slice level, the macroblock level, or the block level.

Furthermore, encoders are desirably designed to provide increased quality, increased performance, or some balance between quality and performance. For example, an encoder with low complexity in various modules (such as motion estimation or entropy encoding) desirably performs at a high level with a reasonable loss of video quality. An encoder with high complexity desirably achieves higher overall quality with a reasonable loss in performance. Also, an encoder with multi-threading design desirably produces bit-exact results as that with single thread unless the violation is indicated explicitly for some reason.

Additionally, a video encoder is desirably designed so that it can be configured for various application scenarios through changes in the operational settings of the encoder. A video encoder should react to specific configurations as desired. Using embodiments of the disclosed technology, a user can verify whether a video encoder reacts properly to user settings. For example, a user can verify whether a video encoder properly reacts to changes to one or more of: the rate control setting, GOP structure setting, entropy encoding mode setting, or source format specification. For instance, a user may configure a video encoder to work with a variable bit rate ("VBR") with a fixed quantization parameter ("QP"), with a VBR with a variable QP, with a constant bit rate ("CBR"), or with a constant quality rate control ("CQ-RC"). Further, a user may also want to specify a certain GOP distance (e.g., 12 or 15 with 1 or 2 B pictures). The encoded bitstream should satisfy the user specifications regardless of the configuration selected.

B. Exemplary Bitstream Analysis Embodiments

Figure 8:
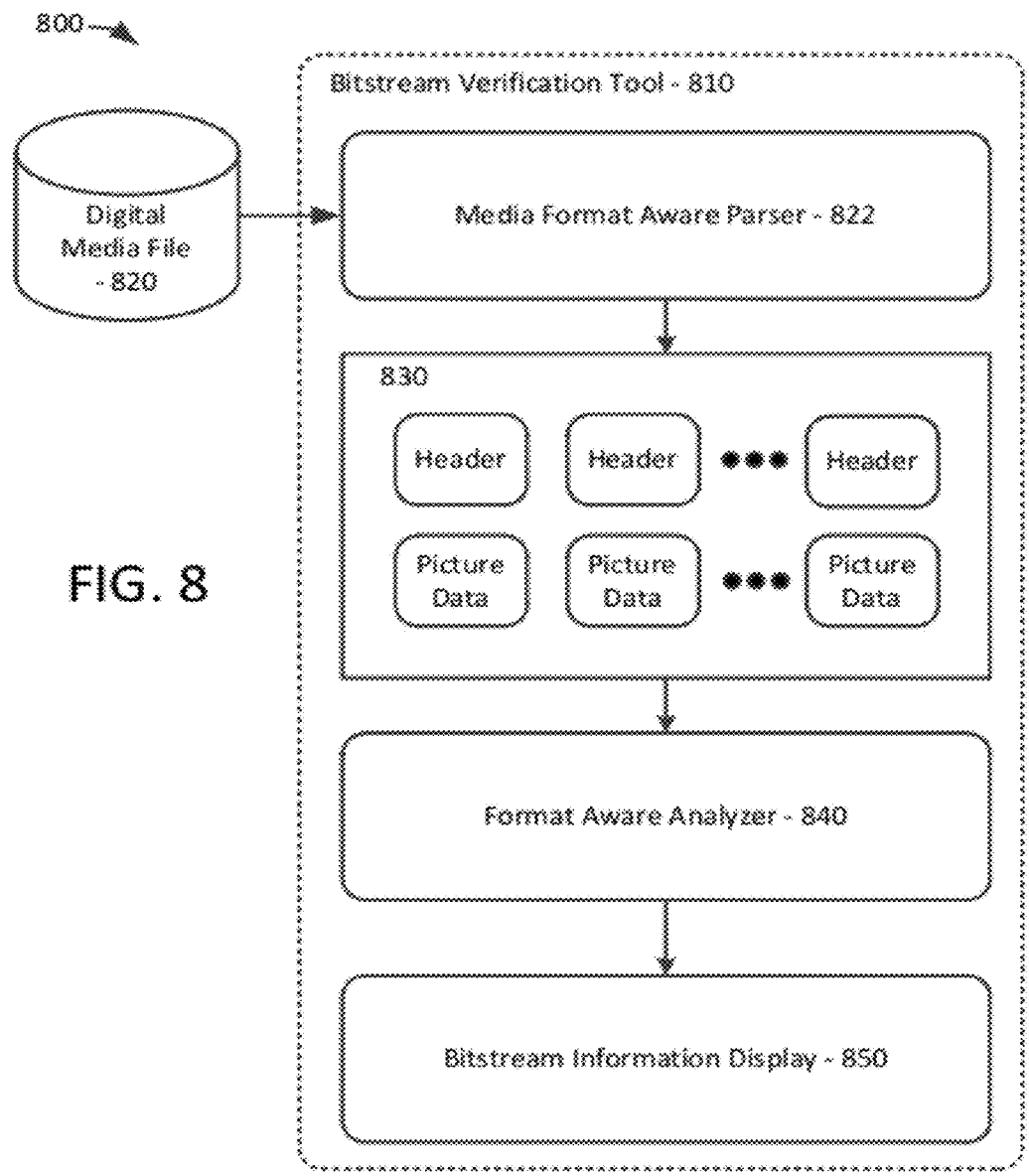
FIG. 8 is a schematic block diagram showing the components and overall flow for a bitstream analyzer in accordance with an exemplary embodiment of the disclosed technology.

FIG. 8 is a schematic block diagram 800 illustrating the components and flow of an exemplary embodiment of a bitstream verification tool 810 according to the disclosed technology. The particular components shown in FIG. 8 should not be construed as limiting, however, as the illustrated components can be used alone or in various combinations and subcombinations with one another. Similarly, the illustrated actions shown in FIG. 8 can be performed alone or in various combinations and subcombinations with one another.

In FIG. 8, a file storing encoded digital media data 820 is input (e.g., buffered into memory or otherwise loaded for analysis) to an exemplary embodiment of a bitstream verification tool 810. The digital media data can be, for example, an encoded bitstream compressed by an encoder being designed and verified (the encoder under test). The encoded bitstream can be encoded according to a known compression standard (e.g., H.264/AVC, MPEG-2, MPEG-4, VC-1, or other such standard).

As shown in FIG. 8, the digital media data 820 is input into a media format aware parser 822. In the illustrated embodiment, the media format aware parser 822 analyzes the encoded digital media data 820 and parses the data into data structures that correspond to the various syntactical elements specified in the corresponding video compression specification. For example, the media format aware parser 822 can parse the digital media data into structures that include the various headers and parametric data associated with each of the headers (the header data). The media format aware parser 822 can also parse the digital media into structures that include picture data. As illustrated, the header data can be arranged into a separate structure corresponding to the particular hierarchical level of the header in the encoded bitstream. For example, the header and parametric data for the fields in the header can be arranged into a structure associated with any one or more of the following hierarchical levels: the sequence (or stream) level, the picture level, the slice level, the macroblock level, the block level, or the sub-block level. In other words, the media format aware parser 822 can identify the syntactical boundaries of the bitstream and generate structures that appropriately organize the data according to the hierarchical levels defined in the corresponding compression standard. Examples of the structures that can be generated by an embodiment of the media format aware parser 822 for each of the headers and associated parametric data in a bitstream are shown in FIG. 3 and Appendix A.

Representation 830 illustrates header data 832, 834, 836 identified and parsed by the media format aware parser 822. Each of header data 832, 834, 836 includes an identification of the header type and the values of the parameters associated with the fields of the header. Each of header data 832, 834, 836 can have the form of a data structure similar to that shown in FIG. 3 or listed Appendix A. Representation 830 also illustrates picture data 833, 835, 837 from the bitstream. The picture data 833, 835, 837 typically comprises values associated with the particular image to be compressed (e.g., luminance and chrominance values, motion compensation values, and the like) rather than values associated with the operational settings of the encoder or decoder. Although representation 830 shows picture data being associated with each item of header data, there may be multiple header data structures before a single picture data structure.

As illustrated in FIG. 8, format aware analyzer 840 operates on the parsed digital media data and analyzes the values of the parameters in the digital media for compliance with an associated compression standard (e.g., compliance with H.264/AVC, MPEG-2, MPEG-4, VC-1, or other such standard). In particular embodiments, the format aware analyzer 840 operates to identify one or more noncompliant parameters in the parsed digital media by comparing the values in the parsed digital media (e.g., each of the values in the parsed digital media) to the permissible ranges for each possible parameter in the bitstream. The permissible ranges can be stored in a reference data file or coded into the computer-executable instructions that implement the format aware analyzer. If a value in the parsed digital media does not fall within the permissible range, it can be flagged or otherwise marked for display to the user. The reference data file or computer-executable instructions for the format aware analyzer can also include information about which portion (e.g., which section or subsection) of the standard the parameter's permissible range is defined by or other information about the parameter (e.g., a description of the purpose of the parameter). For example, for a particular parameter, any one or more of the following types of information can be available for possible display to the user: information about how to address a non-compliant value for the parameter, a list of possible causes for non-compliance of the parameter, or an identification of the component or module of the encoder that commonly produces errors in the parameter.

In certain embodiments, the format aware analyzer 840 is also configured to determine whether the order of the syntactical elements in the bitstream is correct. For example, the reference data file or computer-executable instructions for the format aware analyzer can additionally include information about the order of the syntactical elements as defined by the compression standard. Using this information, the format aware analyzer 840 can evaluate whether the syntactical elements of the bitstream appear in the correct order. A syntactical element that is out of position can be flagged or otherwise marked for display to the user.

In some embodiments, the format aware analyzer 840 is also configured to determine whether the bitstream includes values that appropriately respond to user settings for specific application scenarios (e.g., user settings about which profile of the standard are to be performed by the encoder or other performance variables). For example, in one implementation, the format aware analyzer 840 allows the user to specify the settings that were used by the encoder to create the encoded digital media data 820. This information can be input via a command line or graphical user interface. Based on these settings, the format aware analyzer 840 can determine what values of certain parameters are to appear in the bitstream (e.g., by accessing a reference data file or by referencing values coded into the computer-executable instructions of the format aware analyzer). As a specific example, users may want to set a low-latency encoding mode without B pictures in an encoded clip. The format aware analyzer 840 can be used to verify that the produced compressed bitstream does not include any B pictures. If any discrepencies are found in the bitstream, they can be flagged or otherwise marked for display to the user.

Figure 9:
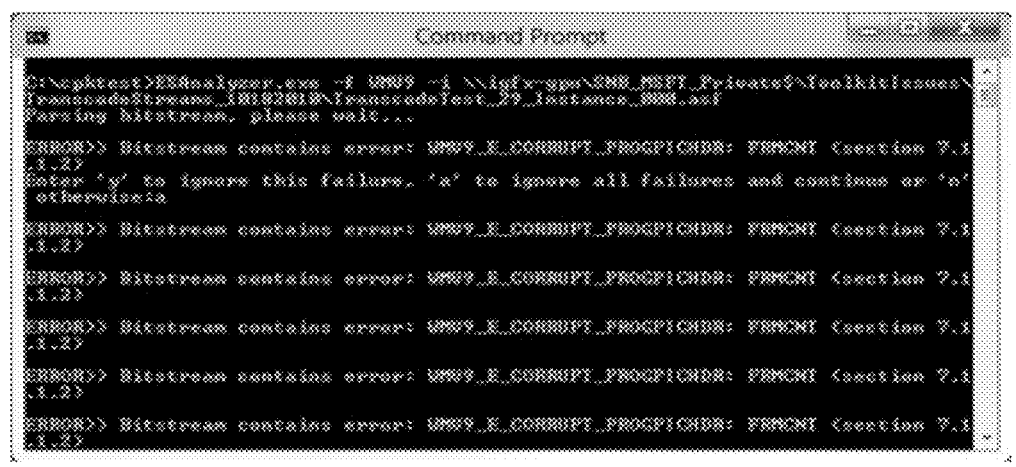
FIG. 9 is a screenshot showing an exemplary manner in which non-compliant parameters identified by the bitstream analyzer of FIG. 8 can be displayed to a user.

As shown in FIG. 8, the results of the analysis performed by format aware analyzer are output to the user through a bitstream information display 850. The information about any one or more of the non-compliant bitstream parameters, non-compliant sequences of syntactical elements, or non-compliant responses to user settings can be displayed to the user using a variety of mechanisms. For example, the information can be displayed in a command line format (e.g., as shown by screenshot 900 of FIG. 9) or using a graphical user interface (e.g., in a format similar to that shown in FIG. 7). Furthermore, the information that is displayed to the user can include a simple "pass/fail" or can additionally include information about which portion or section of the compression standard specifies the non-compliant parameter, thereby enabling the user to more easily address the problem in the encoder design. For example, a graphical user interface can be used to show the non-compliant bitstream parameters along with an indication or the actual text from the corresponding section of the compression standard. Additional information can also be displayed, including the permissible range of values for the non-compliant parameters or recommendations about how to address the non-compliant parameter (e.g., a list of possible causes for the non-compliant parameter or an identification of the component or module of the encoder that commonly produces such errors). Furthermore, any of the compliant parameters can also be shown along with the non-compliant parameters. For instance, the parameters can be displayed in a hierarchical fashion and color-coded (such as that shown in FIG. 7) so that all parameters of the bitstream can be easily viewed by the user.

Having illustrated and described the principles of the illustrated embodiments, it will be apparent to those skilled in the art that the embodiments can be modified in arrangement and detail without departing from such principles. For example, the disclosed techniques are not limited to be being performed on bitstreams that have been previously encoded and stored. Instead, the disclosed techniques can be performed in real-time or substantially in real-time as an encoder produces a "live" bitstream of encoded data. Such an implementation can be used to analyze in real time that affects of changes to the encoder to the resulting bitstream.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

What is claimed is:

1. A method, comprising:
   inputting a conforming bitstream of encoded digital media data, the conforming bitstream being arranged into a syntax that conforms to a video compression standard, the conforming bitstream further comprising parameters that conform to the video compression standard;
   selectively altering one or more of the parameters in the bitstream into parameters that do not conform to the video compression standard, the selective altering being performed such that parameters that would render the bitstream non-decodable if altered are bypassed and left unaltered, thereby creating a non-conforming bitstream that is decodable; and
   storing a non-conforming bitstream of encoded digital media data as a non-conforming test bitstream configured to test a decoder for non-conformant playback capability, the non-conforming bitstream including the one or more selectively altered parameters,
   wherein the method further comprises receiving user input indicative of the parameters that are to be selectively altered, and wherein the parameters that are to be selectively altered are one or more of: parameters in a sequence-level header, parameters in a picture-level header, parameters in a slice-level header, parameters in a macroblock-level header, or parameters in a block-level header.

2. The method of claim 1, further comprising parsing the conforming bitstream into one or more data structures, at least one of the data structures corresponding to a header and associated parameter data from the conforming bitstream.

3. The method of claim 1, wherein the method further comprises receiving user input indicative of an error rate according to which one or more of the parameters that conform to the video compression standard are to be selectively altered, and wherein the selectively altering is performed according to the error rate.

4. The method of claim 3, wherein the error rate indicates a probability of alteration according to which the parameters that conform to the video compression standard are to be selectively altered.

5. The method of claim 1, wherein the method further comprises receiving user input indicative of types of bitstream manipulations that are to be performed during the selective altering, and wherein the selectively altering is performed using only the bitstream manipulations identified by the user input.

6. The method of claim 5, wherein the types of bitstream manipulation indicated by the user input include one or more of the following: parameter data alteration, bitstream element deletion, bitstream element repetition, bitstream element replacement, bitstream element relocation, or deletion of picture data from the bitstream.

7. The method of claim 1, wherein the act of selectively altering one or more of the parameters in the bitstream comprises altering a selected one of the parameters in the bitstream according to a predetermined heuristic, the heuristic identifying a particular alteration to be performed to the selected one of the parameters.

8. The method of claim 1, wherein the act of selectively altering one or more of the parameters in the bitstream comprises:
  determining that a selected one of the parameters in the bitstream is permissibly altered;
  determining that the selected one of the parameters is to be altered by evaluating a user-selected probability of alteration; and
  determining a modified value for the selected one of the parameters using a randomly selected value from within a range of possible values for the selected one of the parameters.

9. The method of claim 1, wherein the non-conforming bitstream emulates a non-conforming bitstream generated by a commercial encoder, and wherein the compression standard is one of H.264/AVC, MPEG-1, MPEG-2, MPEG-4 Pt 2, or VC-1.

10. A method, comprising:
  inputting a conforming bitstream of compressed digital media data, the conforming bitstream being arranged into a syntax that conforms to a video compression standard, the conforming bitstream further comprising parameters that conform to the video compression standard;
  displaying on a display device, the parameters of the compressed digital media data, the parameters comprising one or more of parameters in a sequence-level header, parameters in a picture-level header, parameters in a slice-level header, parameters in a macroblock-level header, or parameters in a block-level header;
  receiving user input indicating one or more alterations to be made to one or more of the parameters of the compressed digital media data, thereby creating a non-conforming bitstream of compressed digital media data; and
  storing the non-conforming bitstream of compressed digital media data as a non-conforming test bitstream configured to test a decoder for non-conformant playback capability.

11. The method of claim 10, further comprising parsing the conforming bitstream into one or more data structures, at least one of the data structures corresponding to a header and associated parameter data from the conforming bitstream.

12. The method of claim 10, wherein the displaying the parameters of the compressed digital media data further comprises displaying an indication of whether one or more of the parameters are parameters that would render the bitstream undecodable if altered.

13. The method of claim 10, wherein the displaying the parameters of the compressed digital media data further comprises displaying one or more of the following for a selected one of the parameters: a valid range for the selected parameter, a possible range for the selected parameter that includes invalid values, a recommended alteration for the selected parameter, or information about a purpose of the selected parameter.

14. A method, comprising:
  inputting a bitstream of encoded digital media data produced by an encoder under test;
  parsing the bitstream into one or more data structures, at least one of the data structures corresponding to a header and associated parameter data from the bitstream;
  identifying one or more parameters in the bitstream that have values that do not comply with permissible ranges as specified by a digital media data compression standard; and
  displaying on a display device via a graphic user interface, the identified one or more parameters along with (a) an indication that the identified one or more parameters do not comply with the digital media data compression standard, and (b) an indication of which portion of the digital media data compression standard specifies the permissible ranges for the one or more parameters, the parameters comprising one or more of parameters in a sequence-level header, parameters in a picture-level header, parameters in a slice-level header, parameters in a macroblock-level header, or parameters in a block-level header.

15. The method of claim 14, further comprising:
  identifying one or more syntactical elements in the bitstream that are not in a sequence compliant with the digital media data compression standard; and
  displaying on the display device via the graphic user interface, the identified one or more syntactical elements along with an indication that the identified one or more syntactical elements are not in a sequence compliant with the digital media data compression standard.

16. The method of claim 14, further comprising:
  receiving an indication of user settings according to which the bitstream was encoded by the encoder under test; and
  identifying one or more parameters in the bitstream that have values that do not comply with expected values as specified by the compression standard for the received user settings; and
  displaying on the display device via the graphic user interface, the identified one or more parameters in the bitstream that have values that do not comply with expected values for the received user settings along with an indication of noncompliance with the digital media data compression standard.

17. One or more computer-readable storage devices or memory storing computer-executable instructions which when executed by a computer cause the computer to perform a method, the method comprising:

inputting a conforming bitstream of encoded digital media data, the conforming bitstream being arranged into a syntax that conforms to a video compression standard, the conforming bitstream further comprising parameters that conform to the video compression standard;

selectively altering one or more of the parameters in the bitstream into parameters that do not conform to the video compression standard, the selective altering being performed such that parameters that would render the bitstream non-decodable if altered are bypassed and left unaltered, thereby creating a non-conforming bitstream that is decodable; and storing a non-conforming bitstream of encoded digital media data as a non-conforming test bitstream configured to test a decoder for non-conformant playback capability, the non-conforming bitstream including the one or more selectively altered parameters, wherein the method further comprises receiving user input indicative of the parameters that are to be selectively altered, and wherein the parameters that are to be selectively altered are one or more of: parameters in a sequence-level header, parameters in a picture-level header, parameters in a slice-level header, parameters in a macroblock-level header, or parameters in a block-level header.

18. The one or more computer-readable storage devices or memory of claim 17, wherein the method further comprises parsing the conforming bitstream into one or more data structures, at least one of the data structures corresponding to a header and associated parameter data from the conforming bitstream.

19. The one or more computer-readable storage devices or memory of claim 17, wherein the method further comprises receiving user input indicative of the parameters that are to be selectively altered, and wherein the selectively altering is performed using only the parameters identified by the user input as candidate parameters for alteration.

20. The one or more computer-readable storage devices or memory of claim 19, wherein the user input indicates that the parameters that are to be selectively altered are one or more of: parameters in a sequence-level header, parameters in a picture-level header, parameters in a slice-level header, parameters in a macroblock-level header, or parameters in a block-level header.

21. The one or more computer-readable storage devices or memory of claim 17, wherein the method further comprises receiving user input indicative of an error rate according to which one or more of the parameters that conform to the video compression standard are to be selectively altered, and wherein the selectively altering is performed according to the error rate.

22. The one or more computer-readable storage devices or memory of claim 21, wherein the error rate indicates a probability of alteration according to which the parameters that conform to the video compression standard are to be selectively altered.

23. The one or more computer-readable storage devices or memory of claim 17, wherein the method further comprises receiving user input indicative of types of bitstream manipulations that are to be performed during the selective altering, and wherein the selectively altering is performed using only the bitstream manipulations identified by the user input.

24. The one or more computer-readable storage devices or memory of claim 23, wherein the types of bitstream manipulation indicated by the user input include one or more of the following: parameter data alteration, bitstream element deletion, bitstream element repetition, bitstream element replacement, bitstream element relocation, or deletion of picture data from the bitstream.

25. The one or more computer-readable storage devices or memory of claim 17, wherein the act of selectively altering one or more of the parameters in the bitstream comprises altering a selected one of the parameters in the bitstream according to a predetermined heuristic, the heuristic identifying a particular alteration to be performed to the selected one of the parameters.

26. The one or more computer-readable storage devices or memory of claim 17, wherein the act of selectively altering one or more of the parameters in the bitstream comprises:

determining that a selected one of the parameters in the bitstream is permissibly altered;

determining that the selected one of the parameters is to be altered by evaluating a user-selected probability of alteration; and determining a modified value for the selected one of the parameters using a randomly selected value from within a range of possible values for the selected one of the parameters.

27. The one or more computer-readable storage devices or memory of claim 17, wherein the non-conforming bitstream emulates a non-conforming bitstream generated by a commercial encoder, and wherein the compression standard is one of H.264/AVC, MPEG-1, MPEG-2, MPEG-4 Pt 2, or VC-1.

28. One or more computer-readable storage devices or memory storing computer-executable instructions which when executed by a computer cause the computer to perform a method, the method comprising:

inputting a conforming bitstream of compressed digital media data, the conforming bitstream being arranged into a syntax that conforms to a video compression standard, the conforming bitstream further comprising parameters that conform to the video compression standard;

displaying on a display device, the parameters of the compressed digital media data, the parameters comprising one or more of parameters in a sequence-level header, parameters in a picture-level header, parameters in a slice-level header, parameters in a macroblock-level header, or parameters in a block-level header;

receiving user input indicating one or more alterations to be made to one or more of the parameters of the compressed digital media data, thereby creating a non-conforming bitstream of compressed digital media data; and storing the non-conforming bitstream of compressed digital media data as a non-conforming test bitstream configured to test a decoder for non-conformant playback capability.

29. The one or more computer-readable storage devices or memory of claim 28, wherein the method further comprises parsing the conforming bitstream into one or more data structures, at least one of the data structures corresponding to a header and associated parameter data from the conforming bitstream.

30. The one or more computer-readable storage devices or memory of claim 28, wherein the displaying the parameters of the compressed digital media data further comprises displaying an indication of whether one or more of the parameters are parameters that would render the bitstream undecodable if altered.

31. The one or more computer-readable storage devices or memory of claim 28, wherein the displaying the parameters of the compressed digital media data further comprises displaying one or more of the following for a selected one of the parameters: a valid range for the selected parameter, a possible range for the selected parameter that includes invalid values, a recommended alteration for the selected parameter, or information about a purpose of the selected parameter.

32. One or more computer-readable storage devices or memory storing computer-executable instructions which when executed by a computer cause the computer to perform a method, the method comprising:

inputting a bitstream of encoded digital media data produced by an encoder under test;

parsing the bitstream into one or more data structures, at least one of the data structures corresponding to a header and associated parameter data from the bitstream;

identifying one or more parameters in the bitstream that have values that do not comply with permissible ranges as specified by a digital media data compression standard; and displaying on a display device via a graphic user interface, the identified one or more parameters along with (a) an indication that the identified one or more parameters do not comply with the digital media data compression standard, and (b) an indication of which portion of the digital media data compression standard specifies the permissible ranges for the one or more parameters, the parameters comprising one or more of parameters in a sequence-level header, parameters in a picture-level header, parameters in a slice-level header, parameters in a macroblock-level header, or parameters in a block-level header.

33. The one or more computer-readable storage devices or memory of claim 32, wherein the method further comprises:

identifying one or more syntactical elements in the bitstream that are not in a sequence compliant with the digital media data compression standard; and displaying on the display device via the graphic user interface, the identified one or more syntactical elements along with an indication that the identified one or more syntactical elements are not in a sequence compliant with the digital media data compression standard.

34. The one or more computer-readable storage devices or memory of claim 32, wherein the method further comprises:

receiving an indication of user settings according to which the bitstream was encoded by the encoder under test; and identifying one or more parameters in the bitstream that have values that do not comply with expected values as specified by the compression standard for the received user settings; and displaying on the display device via the graphic user interface, the identified one or more parameters in the bitstream that have values that do not comply with expected values for the received user settings along with an indication of non-compliance with the digital media data compression standard.

* * * * *